US009377988B2

(12) United States Patent
 Cudak et al.

(10) Patent No.: US 9,377,988 B2
(45) Date of Patent: *Jun. 28, 2016

(54) DISPLAYING A CONSOLIDATED RESOURCE IN AN OVERLAPPING AREA ON A SHARED PROJECTION

(71) Applicant: Lenovo Enterprise Solutions (Singapore) Pte. Ltd., Singapore (SG)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 205 days.

This patent is subject to a terminal disclaimer.

(21) Appl. No.: 13/951,961

(22) Filed: Jul. 26, 2013

(65) Prior Publication Data

US 2015/0029077 A1    Jan. 29, 2015

Related U.S. Application Data

(63) Continuation of application No. 13/950,010, filed on Jul. 24, 2013.

(51) Int. Cl.
 *H04N 9/31* (2006.01)
 *G06F 3/14* (2006.01)
 *G09G 5/00* (2006.01)

(52) U.S. Cl.
 CPC ............. *G06F 3/1446* (2013.01); *G09G 5/001* (2013.01); *H04N 9/3147* (2013.01); *G06F 3/1423* (2013.01); *G06F 3/1438* (2013.01); *G09G 2340/12* (2013.01); *G09G 2360/08* (2013.01)

(58) Field of Classification Search
 CPC ... H04N 9/3147; G06F 3/1423; G06F 3/1446; G06F 3/1438; G09G 2340/12
 See application file for complete search history.

(56) References Cited

U.S. PATENT DOCUMENTS 6,456,339 B1 * 9/2002 Surati et al. .................... 348/745
6,829,664 B2 * 12/2004 Nomizo .................. G06F 3/033
                                                              710/12

(Continued)

FOREIGN PATENT DOCUMENTS

WO    WO 2007111591 A1 * 10/2007 ............. H04N 5/268

OTHER PUBLICATIONS

Sugimoto et al., "Projecting Displays of Mobile Devices Based on 3D Positions and Intuitive Manipulation Techniques", Transactions of Information Processing Society of Japan, vol. 47, No. 6, pp. 1976-1985, 2006. (Abstract Only).

(Continued)

*Primary Examiner* — Bao-Luan Le
(74) *Attorney, Agent, or Firm* — Law Office of Jim Boice

(57) ABSTRACT

A method, system, and/or computer program product enables the sharing of an overlapping area on a shared projection. A system detects an overlapping area on a shared projection, which presents content from a first projection and a second projection. A computing device identifies any redundant resources, which perform the same function as one another, in the first projection and the second projection. A consolidated resource, which provides the same function as the redundant resources, is defined and/or created, and then displayed in the overlapping area.

15 Claims, 6 Drawing Sheets

(56) References Cited

U.S. PATENT DOCUMENTS

| | | | |
|---|---|---|---|
| 6,840,625 B2* | 1/2005 | Koyama | H04N 5/44513 345/619 |
| 7,061,476 B2* | 6/2006 | Fujiwara | G06F 3/1423 345/2.2 |
| 7,306,341 B2* | 12/2007 | Chang | 353/94 |
| 7,474,286 B2* | 1/2009 | Hajjar et al. | 345/81 |
| 7,942,530 B2* | 5/2011 | Majumder et al. | 353/30 |
| 8,171,400 B2* | 5/2012 | Nomizo | 715/243 |
| 8,232,957 B2* | 7/2012 | Hajjar et al. | 345/102 |
| 8,266,274 B2 | 9/2012 | Allen et al. | |
| 8,342,696 B2* | 1/2013 | Ivashin et al. | 353/94 |
| 8,352,966 B2 | 1/2013 | Clayton et al. | |
| 8,736,765 B2* | 5/2014 | Casper et al. | 348/578 |
| 9,071,773 B2 | 6/2015 | Oka | |
| 2001/0013843 A1* | 8/2001 | Fujiwara | G06F 3/1423 345/1.2 |
| 2002/0021259 A1* | 2/2002 | Itaki et al. | 345/1.1 |
| 2002/0159035 A1* | 10/2002 | Koyama | H04N 5/44513 353/31 |
| 2003/0126326 A1* | 7/2003 | Nomizo | G06F 3/033 710/72 |
| 2005/0116968 A1* | 6/2005 | Barrus | H04N 9/3147 345/698 |
| 2006/0192925 A1* | 8/2006 | Chang | 353/94 |
| 2006/0227087 A1* | 10/2006 | Hajjar et al. | 345/84 |
| 2008/0100805 A1* | 5/2008 | Majumder et al. | 353/30 |
| 2009/0096939 A1* | 4/2009 | Nomizo | 348/744 |
| 2009/0153582 A1* | 6/2009 | Hajjar et al. | 345/592 |
| 2009/0174632 A1* | 7/2009 | Hajjar et al. | 345/81 |
| 2009/0273715 A1* | 11/2009 | Casper et al. | 348/578 |
| 2010/0100626 A1 | 4/2010 | Allen et al. | |
| 2011/0197147 A1 | 8/2011 | Fai | |
| 2011/0234896 A1* | 9/2011 | Ivashin et al. | 348/445 |
| 2011/0292080 A1* | 12/2011 | Oka | 345/634 |
| 2012/0290943 A1 | 11/2012 | Toney et al. | |
| 2013/0258209 A1* | 10/2013 | Tocze et al. | 348/744 |

OTHER PUBLICATIONS

Miyahara et al., "Intuitive Manipulation Techniques for Projected Displays of Mobile Devices", CHI 2005, Portland, OR, Apr. 2-7, 2005, pp. 1657-1660.

Ashdown et al., "Escritoire: A Personal Projected Display", IEEE Computer Society, IEEE Multimedia, Jan.-Mar. 2005, pp. 34-42.

Shilkrot et al., "ProCoMo: Projected Collaboration using Mobile Devices", MobileHCI 2011, Aug. 30-Sep. 2, 2011, pp. 333-336.

IBM, "System and Method for Collabration of Mesh-Up Service", IPCOM000180982D, Mar. 23, 2009, pp. 1-12.

Anonymous, "Method for Adaptive User Experience Management between Widgets", IPCOM000202123D, Dec. 4, 2010, pp. 1-3.

Anonymous, "System and Method of Describing a Composite Mashups Application Framework and Autonomic Rendering Engine with Business Logic", IPCOM000216389D, Apr. 3, 2012, pp. 1-4.

Xing et al., "Multi-User Interaction using Handheld Projectors", ACM, UIST'07, Oct. 7-10, 2007, pp. 43-52.

P. Mistry "Sixth Sense: About", pranavmistry.com, 2010, retrieved Jul. 24, 2013, pp. 1-5.

Anonymous, "Integration Appliances: Deliver Application Integration Projects in Days", Cast Iron Systems, Inc. Jul. 2007, pp. 1-7.

Anonymous, "Enterprise Application Integration", Wikipedia.org, retrieved Jul. 24, 2013, pp. 1-8.

P. Brown "The Integration Appliance", originally published at technology.inc.com, copyright Mansueto Ventures LLC, 2008, retrieved via web.archive.org on Jul. 24, 2013, pp. 1-4.

T. Ricker, "Samsung AMOLED Beam SPH-V Projector Phone is not what we've been waiting for", engadget.com, AOL Inc., Apr. 14, 2010, pp. 1-3.

H. Saabedra, "AT&T Launches LG eXpo Windows Mobile Projector Phone", phonenews.com, Dec. 17, 2009, pp. 1-3.

A. Hilal, "CVSL-112 Projection Phone", trendygadget.com, Sep. 24, 2008, pp. 1-3.

Anonymous, "LG Projector Phone Unveiled", artuji.com, Dec. 13, 2009, pp. 1-2.

Ed.: Ron Mertens, "Projector Phone", picoprojector-info.com, retrieved Jul. 24, 2013, pp. 1-2.

E. Price, "Samsung Shows Off Latest Galaxy Beam Projector Phone", gizmag.com, Feb. 26, 2012, pp. 1-2.

U.S. Appl. No. 13/950,010—Non-Final Office Action Mailed Jul. 17, 2015.

U.S. Appl. No. 13/950,010. Final Office Action Mailed Mar. 16, 2016.

* cited by examiner

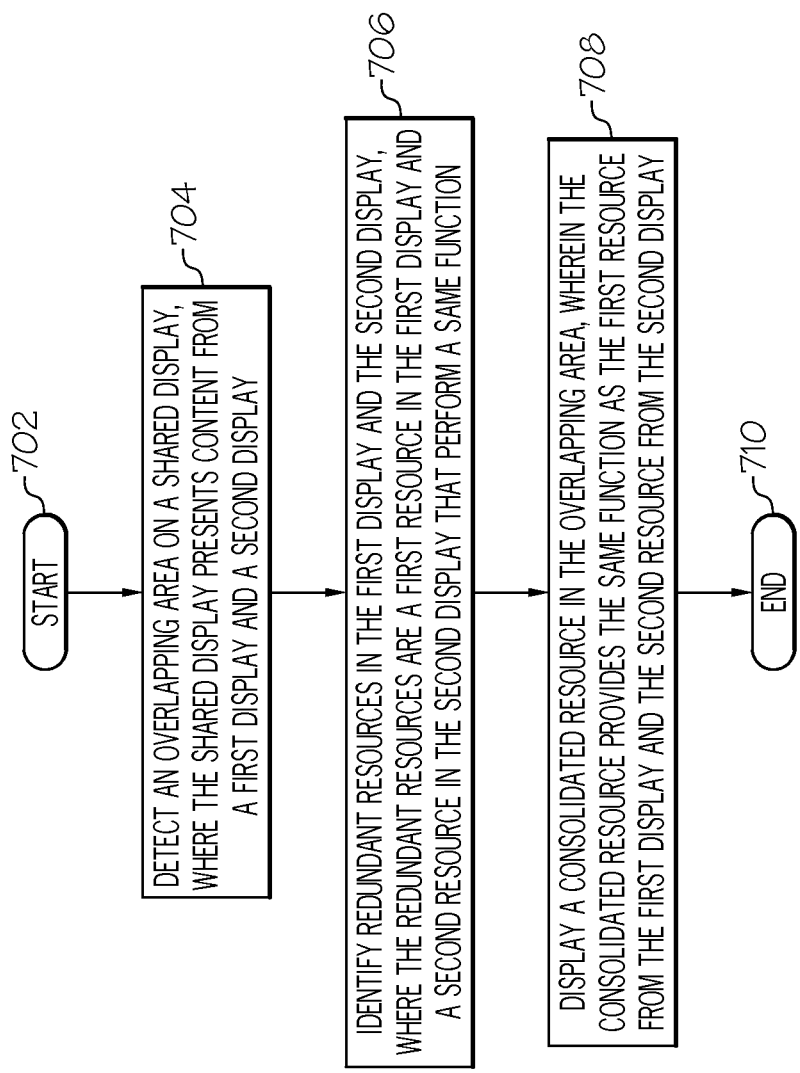

DISPLAYING A CONSOLIDATED RESOURCE IN AN OVERLAPPING AREA ON A SHARED PROJECTION

BACKGROUND

The present disclosure relates to the field of computers, and specifically to the use of multiple computers sharing a common display. Still more particularly, the present disclosure relates to managing display space on a common display.

Content can be displayed on various media, either electronic or non-electronic. That is, one means for displaying content is on an electronic medium, such as a plasma screen, a light-emitting diode (LED) screen, a liquid crystal display (LCD) screen, a cathode ray tube (CRT) screen, etc. Another means for displaying content is on a non-electronic medium, such as a projector screen, a wall or other surface, etc. Another name for displaying content from a device onto a non-electronic medium is "projection computing". The use of either type of display media, whether electronic or non-electronic, allows user interaction with the display media and/or the source of the content being displayed. With an electronic display, such movement is recognized by the movement of an input device (e.g., a mouse, a touch on a touch screen, etc.). With a non-electronic display, such movement is recognized by motion and/or audio sensors, which detect where a user's hand/finger/body is with relation to what is being projected on the non-electronic display surface.

SUMMARY

A method, system, and/or computer program product enables the sharing of an overlapping area on a shared projection. A system detects an overlapping area on a shared projection, which presents content from a first projection and a second projection. A computing device identifies any redundant resources, which perform the same function as one another, in the first projection and the second projection. A consolidated resource, which provides the same function as the redundant resources, is defined and/or created, and then displayed in the overlapping area.

BRIEF DESCRIPTION OF THE SEVERAL VIEWS OF THE DRAWINGS

FIG. 7 is a high level flow chart of one or more exemplary steps taken by a computing device (e.g., one or more processors) to consolidate resource usage within an overlapping area of a shared projection.

DETAILED DESCRIPTION

Figure 1:
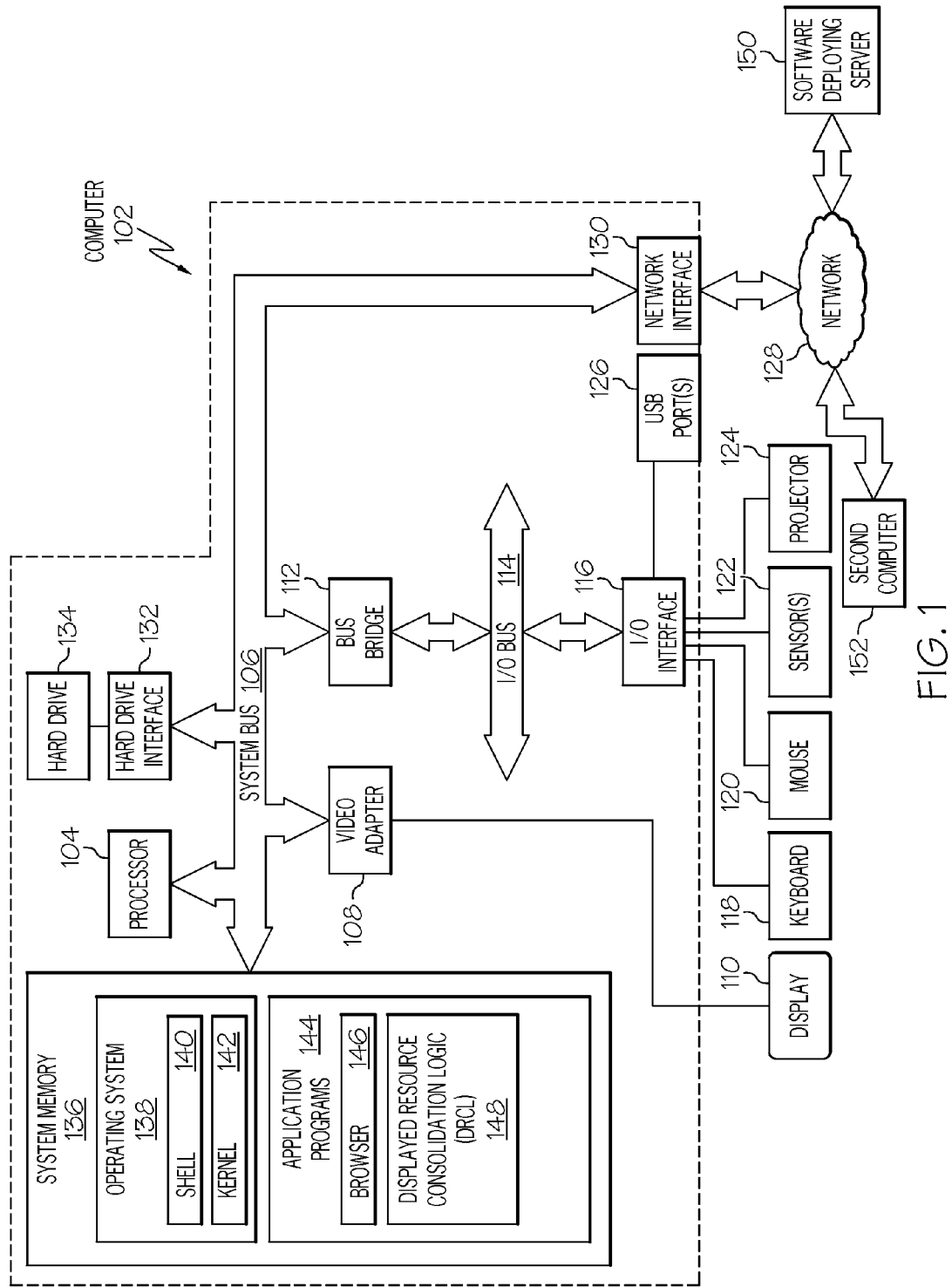
FIG. 1 depicts an exemplary system and network which may be used to implement the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or a second computer 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, one or more sensors 122 (which may include a video/motion sensor, an audio/sound sensor, and/or other sensors that are capable of detecting the presence and location of movement and/or sound with a high degree of resolution), a projector 124 (e.g., an audio/visual projector that projects images onto a non-electronic medium such as a screen, a wall, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems such as desired entity 152.

Application programs 144 in computer 102's system memory (as well as software deploying server 150's system memory) also include a Displayed Resource Consolidation Logic (DRCL) 148. DRCL 148 includes code for implementing the processes described below, including those described in FIGS. 2-7. In one embodiment, computer 102 is able to download DRCL 148 from software deploying server 150, including in an on-demand basis, wherein the code in DRCL 148 is not downloaded until needed for execution. Note further that, in one embodiment of the present invention, software deploying server 150 performs all of the functions associated with the present invention (including execution of DRCL 148), thus freeing computer 102 from having to use its own internal computing resources to execute DRCL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Note further that one or more of the components depicted in FIG. 1 represent a "computing device" that, in one embodiment, perform one or more of the steps/processes described herein. In one embodiment, such steps/processes are performed by any type of hardware and/or software and/or combination thereof, including, but not limited to, programmable hardware such as a field programmable gate array (FPGA), specialized hardware chips, etc.

While computer displays are often associated with a single computer, two computers can share a single display, in order to promote collaboration between two users, who may be at different locations or a same location. That is, information from a first display from a first computing device may be merged with information from a second display from a second computing device to create consolidated information that is presented on a third display. The third display may be from a third computing device, or it may simply be the first display or the second display.

"Projection computing" is defined as displaying content on some nearby surface. Oftentimes, however, the real estate (i.e., available area) on the nearby surface is limited. For example, assume that two users are sitting next to each other and want to project their content onto a small surface at the same time. The present invention provides a means for using this limited surface efficiently.

The present invention is also used when content from two content sources is being displayed on a single electronic display (e.g., a flat screen, a CRT, an electronic display that is part of a table top, etc.). Thus, the term "projection" is used to describe any display of content, whether from a video projector onto a non-electronic surface such as a wall or screen, or content that is displayed on a single electronic display such as a flat screen. That is, the present invention presents a novel and nonobvious method, system, and/or computer program product to make the best use of available real estate by determining overlapping projection displays, and then negotiating the movement of informational/non-interactive application windows, applications not in use, redundant widgets, etc. into some portion of the shared region.

Figure 2:
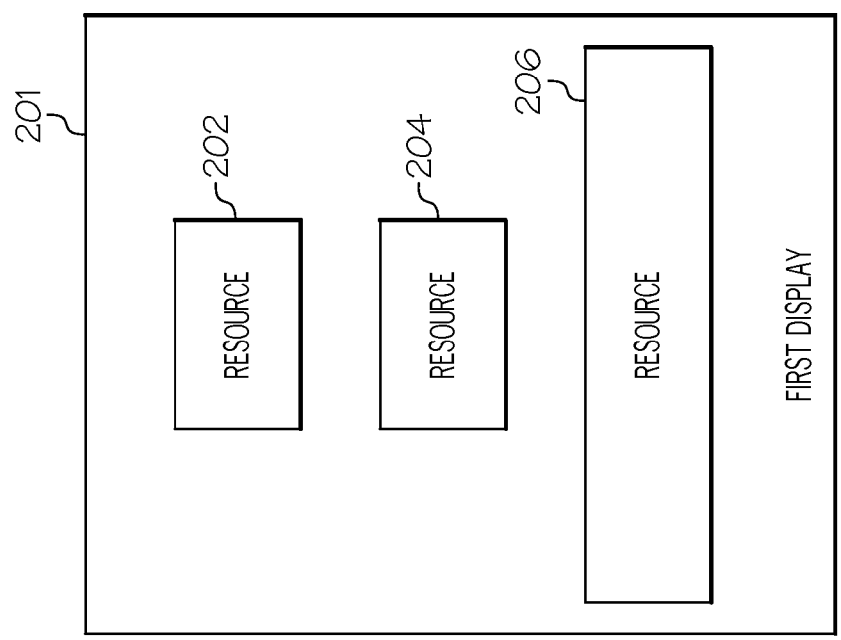
FIG. 2 illustrates a first display containing various resources.

With reference now to FIG. 2, a first display 201 includes resources 202, 204, and 206. Examples of such resources include, but are not limited to, widgets, interfaces to applications, active fields for inserting data to be processed by applications, etc. For example, resource 202 may be a widget, which is a generic software application, made up of portable code, which can be used across different software platforms. For example, resource 202 may be a widget that is a representation of a clock, which provides the current time to a viewer of the first display 201, preferably showing the local time for the time zone in which the device (e.g., computer) that supports the first display 201 is presently located. Another exemplary widget (e.g., resource 202) is a small computer icon that displays local weather conditions (i.e., a "weather icon"), current stock prices, etc. Such widgets require no input from the user, and thus are information-only widgets.

Another type of resource is represented by resource 204 in FIG. 2. Resource 204 may be a computer icon that, unlike the weather icon described above, allows a user to provide input to a software application. For example, resource 204 may be an active field that receives a user's input to control a commonly shared application, such as a media player, a spreadsheet, etc.

Another resource depicted in first display 201 in FIG. 2 is resource 206. In one embodiment, resource 206 is an interface to a software application that is being used by a person who is viewing the first display 201. For example, resource 206 may be an application such as a spreadsheet, a word processing program, etc. that this person has opened and is currently using, and should not be used by another user of a different computer. That is, as described herein, resource 206 in FIG. 2 may be displayed along with resource 306 from FIG. 3 in a shared projection. However, resource 206 will only be used by a user of computer that generated the first display 201, while resource 306 will only be used by a user of the computer that generated the second display 303 in FIG. 3. Returning to resource 206 in FIG. 2, in one embodiment resource 206 may be an active field that receives a user's identifier and password, thus allowing that user to log into a particular webpage, access a particular application, etc.

Figure 3:
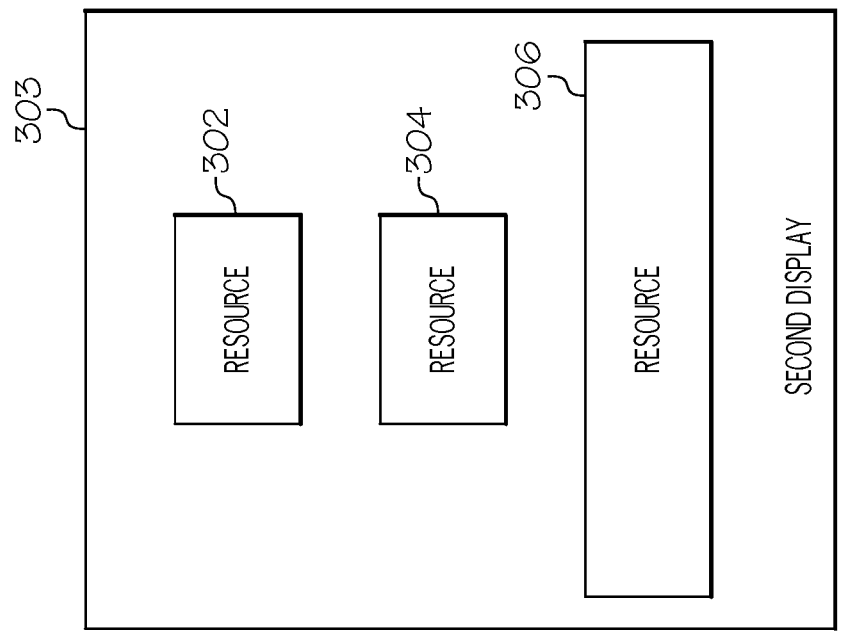
FIG. 3 depicts a second display containing at least one resource that has a same function as at least one resource in the first display shown in FIG. 2.

With reference now to FIG. 3, a second display 303 contains similar resources as described in FIG. 2. For example, resource 302 may be a widget such as a clock that does not accept user inputs; resource 304 may be a widget that does accept user inputs; and resource 306 may be an interface to a software application that is being used by a viewer of the second display 303.

Assume now that resource 202 in FIG. 2 and resource 302 in FIG. 3 are the same resources, or at least provide the same functionality. For example, resource 202 and resource 302 may both be clock widgets that show the current time. Similarly, assume that resource 204 in FIG. 2 and resource 304 in FIG. 3 are also the same resources, or at least provide the same functionality. For example, resource 204 and resource 304 may both allow a user to input data into a same webpage, a same software application, etc. As such, resource 202 and resource 302 would be redundant if placed on a same projection/display, as would resource 204 and resource 304.

Figure 4:
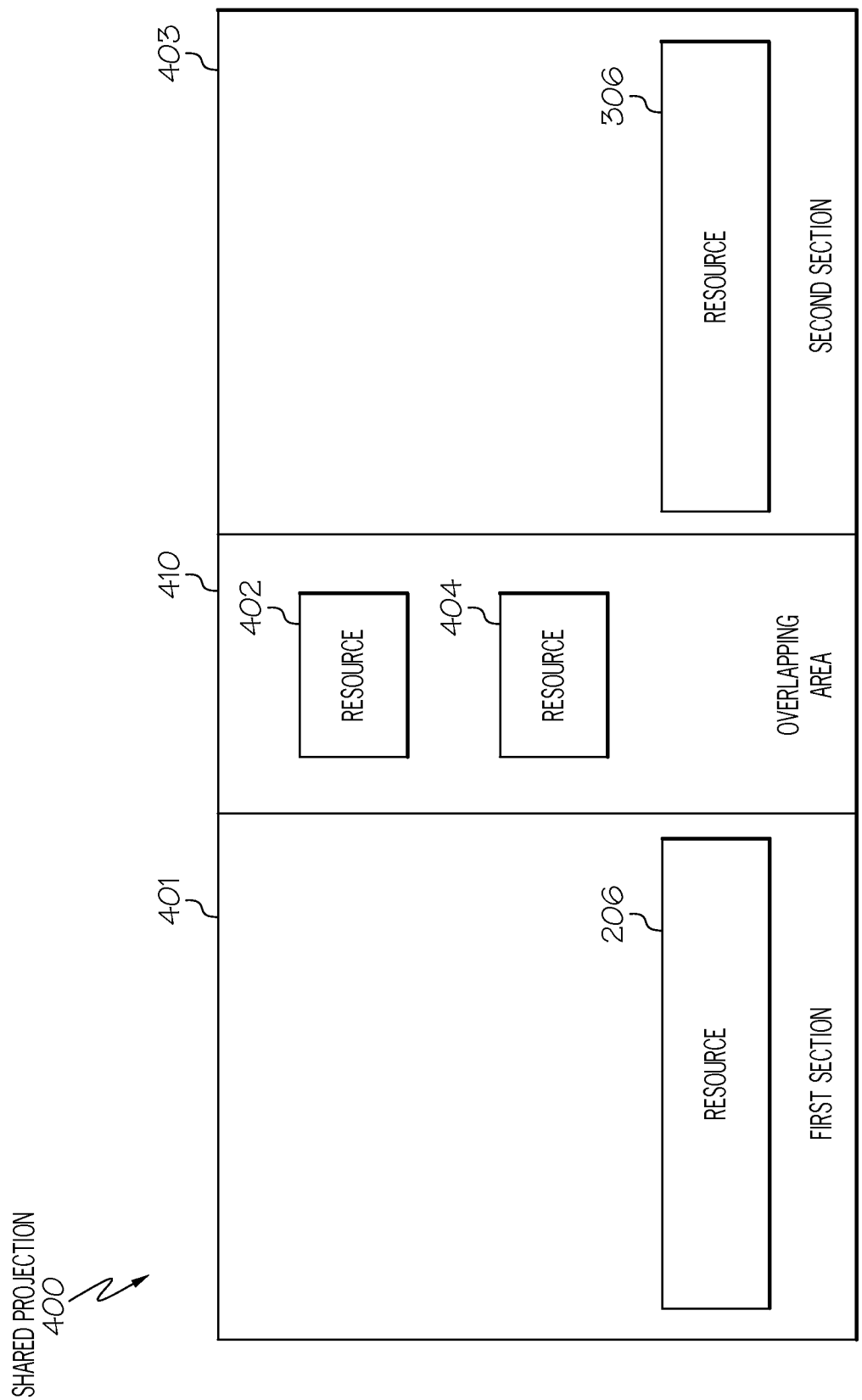
FIGS. 4-6 illustrate different embodiments of a shared projection that presents the content of the first and second display in FIGS. 2-3, and which include a shared overlapping area.

With reference then to FIG. 4, consider shared projection 400, which may be a video projection onto a non-electronic screen/surface, or which may be a display on an electronic display such as a flat screen. Shared projection 400 has three sections: first section 401 (which includes part of first display 201 shown in FIG. 2); second section 403 (which includes part of second display 303 shown in FIG. 3); and an overlapping area 410 (which includes parts of both first display 201 from FIG. 2 and second display 303 from FIG. 3). While resource 206 continues to be presented in its original and unchanged form as resource 206 (as presented in FIG. 2), and resource 306 continues to be presented in its original and unchanged form as resource 306 (as presented in FIG. 3), resources 202 and 302 are now replaced by a consolidated resource 402. That is, consolidated resource 402 is now a widget (e.g., a clock widget) that is 1) the same widget a resource 202 described above; 2) the same widget as resource 302 described above; or 3) a new widget that provides the same function as resources 202 and/or 302. That is, 1) resource 202 continues to be displayed in the shared projection 400 while resource 302 is removed; 2) resource 302 continues to be displayed in the shared projection 400 while resource 202 is removed; or 3) both resource 202 and resource 302 are removed from the shared projection 400, and are replaced with a new resource/widget, which provides the same function as the original resources 202 and 302. Similarly, consolidated widget 404 replaces the resources 204 and 304 depicted in and describe above in FIG. 2 and FIG. 3.

As depicted in FIG. 4, in one embodiment, the new consolidated resources 402 and 404 are placed in the overlapping area 410, which is an overlapping region of the first display 201 and second display 303 shown in FIG. 2 and FIG. 3 when these displays are projected/displayed on a single projection/display (e.g., shared projection 400). In one embodiment, overlapping area 410 is reserved for consolidated resources (e.g., 402, 404), which replace redundant resources that are represented/displayed in the multiple displays that make up the shared projection 400.

Figure 5:
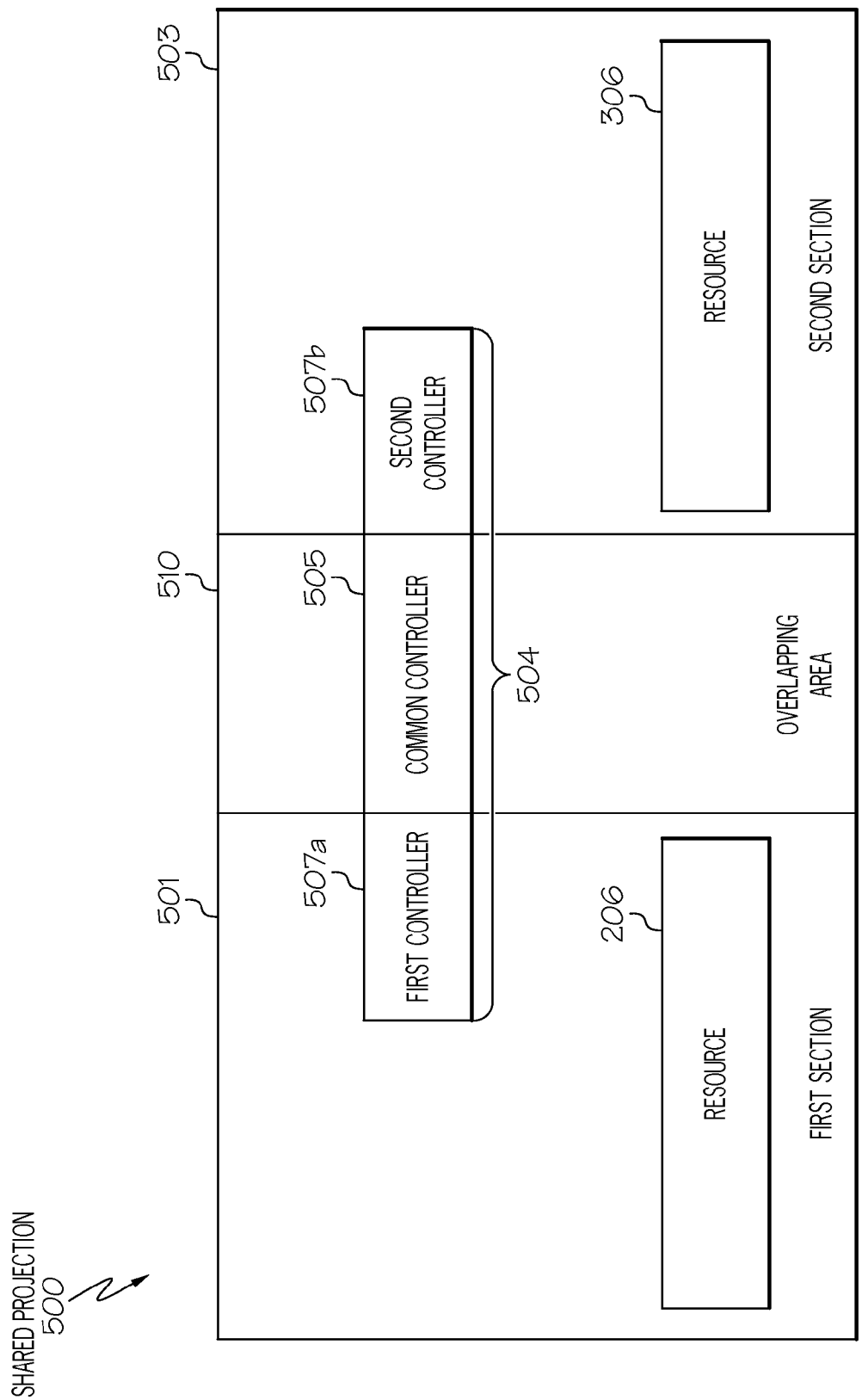

With reference now to FIG. 5, in one embodiment a shared projection 500 has a consolidated resource 502 that allows individual controls plus a common control. For example, assume that shared projection 500 includes a first section 501 and a second section 503, along with an overlapping area 510, similar to respective elements 401, 403, and 410 depicted in FIG. 4. However, the consolidated resource 504, which replaces resources 204 and 304 described above, includes a common controller 505, a first controller 507a, and a second controller 507b. In this embodiment, a user who has access to control the first section 501 (e.g., a user of a first source device that is projecting/displaying/generating the first section 501) has exclusive control over first controller 507*a*. Similarly, a user who has access to the device that generated the second section 503 has exclusive control over the second controller 507*b*. Finally, both users have either 1) a common control of common controller 505, or 2) no control of common controller 505. For example, assume that consolidated resource 504 controls an audio/video playback device. That is, in one embodiment, the first user is able to use first controller 507*a* to control the play/stop control only for content that he provides to first section 501; and the second user is able to use second controller 507*b* to control the play/stop control only for content that he provides to second section 503. However, the common controller 505 is available to either user, in order to control brightness/volume and/or other settings for content provided by either user. Alternatively, neither user is able to access the common controller 505, thus making the brightness/volume settings fixed.

Figure 6:
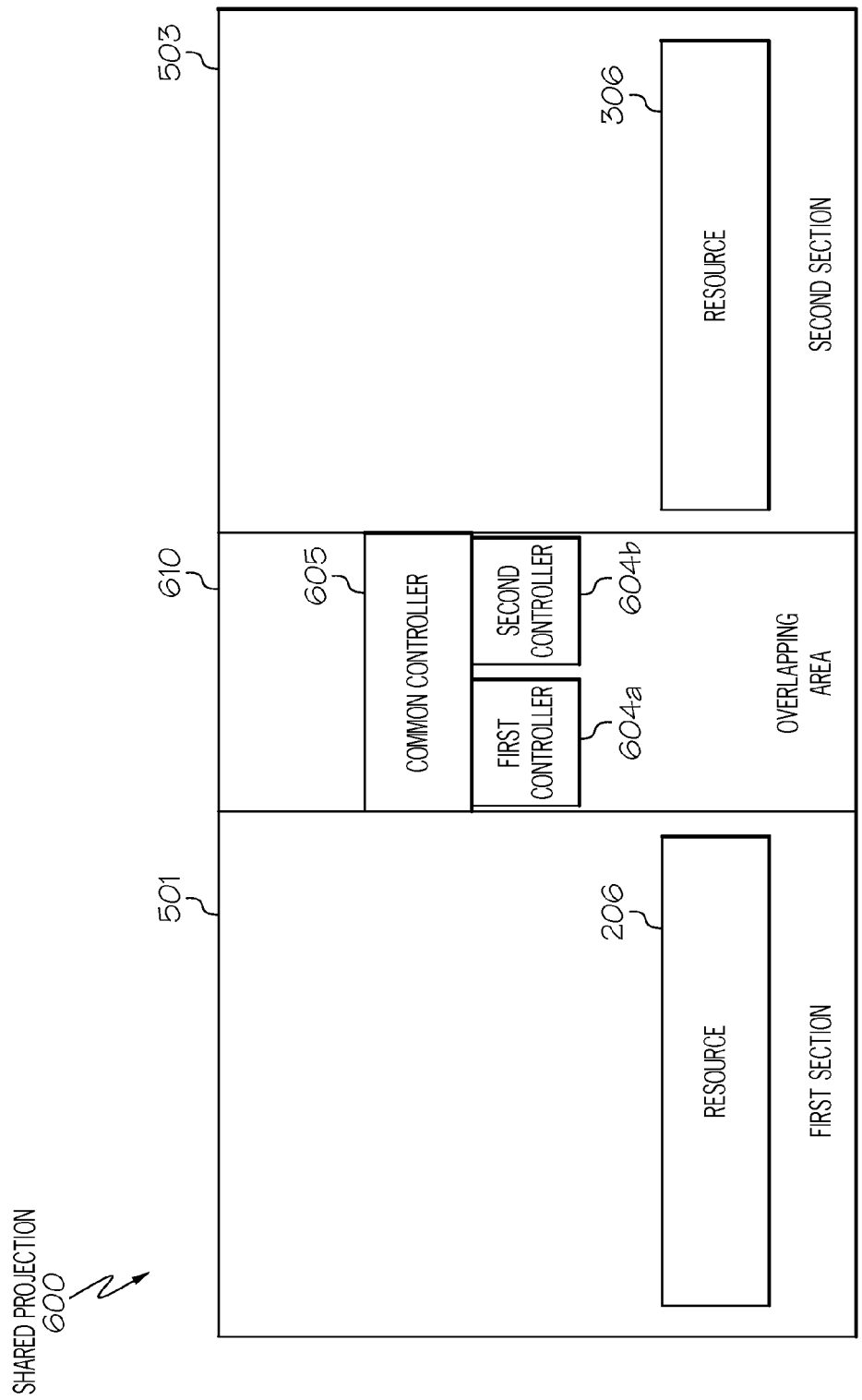

FIG. 6 presents a shared projection 600 that is similar to the shared projection 500 depicted in FIG. 5. However, in FIG. 5 the overlapping area 510 is reserved for the common controller 505 described above, while in FIG. 6 the overlapping area 610 is reserved for the common controller 605 (analogous to the common controller 505 depicted in FIG. 5) as well as first controller 604*a* (analogous to first controller 507*a* in FIG. 5) and second controller 604*b* (analogous to second controller 507*b* in FIG. 5).

With further respect to FIG. 6, in one embodiment controllers may be cross-enabled. For example, assume that first controller 604*a* controls the display of first section 501 and the second controller controls the display of second section 503. In one embodiment, however, a single user is able to control both the first and second controllers 604*a*-604*b*. For example, a user of the device that is generating the content found in first section 501 is able in one embodiment to control both the display of first section 501 and second section 503 using the respective first controller 604*a* and second controller 604*b*. In one embodiment, this ability is based on an authority to perform such cross-controlling. This authority may be based on a role/title of a particular user, a password known to a particular user, etc.

With reference now to FIG. 7, a high level flow chart of one or more exemplary steps taken by a computing device to consolidate resource usage within an overlapping area of a shared projection is presented. After initiator block 702, a computing device detects an overlapping area on a shared projection (block 704). This shared projection presents content from a first projection and a second projection. The first projection and the second projection may be projections onto a non-electronic medium (e.g., a screen or wall), or they may be concurrent representations on an electronic medium, such as a flat screen, a CRT, a plasma screen, a LCD screen, etc. The first projection is sourced from (i.e., is provided by) a first device (e.g., a first computer, a smart phone, etc.) used by a first user, and the second projection is sourced from a second device (e.g., a second computer, smart phone, etc.) that is used by a second user.

As described in block 706, a computing device then identifies redundant resources in the first projection and the second projection. As described herein, these redundant resources are a first resource (e.g., a first widget, desktop icon, etc.) in the first projection and a second resource (e.g., a second widget, desktop icon, etc.) in the second projection that perform a same function.

As described in block 708, a consolidated resource is then displayed in the overlapping area of the shared projection. As described herein, the consolidated resource provides the same function as the first resource from the first projection and the second resource from the second projection. The process ends at terminator block 710.

In one embodiment of the present invention, a computing device identifies an inactive widget. An inactive widget is a desktop widget (e.g., a widget that allows a user to access a website, access a remote camera, provide input to a particular software application, etc.) found in both the first projection and the second projection, and that has not been activated for longer than a predefined period of time. In this embodiment, the inactive widget is displayed in the overlapping area along with the consolidated resource(s) described above.

In one embodiment of the present invention, the redundant resources are redundant desktop widgets, which are identified by the condition that they are non-interactive widgets that provide only informational data (e.g., a clock widget that just shows the current local time), and do not accept user inputs for processing by a software application. That is, such widgets present information that is independent of any user input.

In one embodiment of the present invention, the first resource is removed from the first projection, and the second resource is displayed and used as the consolidated resource in the overlapping area.

In one embodiment of the present invention, the first projection is generated by a first device and the second projection is generated by a second device. In one embodiment, the consolidated resource is a clock widget that provides a display of a current time. In response to a first activation of the clock widget by a user of the first device, time from a first time zone is displayed on the clock widget. In response to a second activation of the clock widget by a user of the second device, time from a second time zone is displayed on the clock widget.

In one embodiment of the present invention, the consolidated resource is created from a combination of the first resource and the second resource. For example, assume that the first resource is a digital clock representation and the second resource is an analog clock representation on the shared projection. The consolidated resource may be a clock that shows both analog and digital time representation. The consolidated resource is then displayed in the overlapping area (e.g., element 610 shown in FIG. 6), while the first resource (e.g., the "digital" clock") from the first projection and the second resource (e.g., the "analog" clock) from the second projection are removed from the shared projection.

In one embodiment of the present invention, the first projection is generated by a first device and the second projection is generated by a second device. In one embodiment, a determination is made, by the first device, the second device, or by a third management device, as to the level of system resources availability in the first device and the second device. This determination is made by measuring how heavily loaded/taxed resources are. For example, a device/system will measure how much system memory is available to a device, how heavily a processor in a device is being used, how much bandwidth exists in various internal and external busses, etc. If a determination is made that the first device has fewer available system resources than the second device, then the first resource is removed from the first projection and the second resource is placed as the consolidated resource in the overlapping area. For example, if a first device generates a first widget, a second device generates a second widget, and the system resources of first device are currently being over-taxed/overloaded, then the first device no longer has to generate the first widget in the shared projection. Rather, the second device provides its copy of the redundant widget (i.e., the second widget) to the shared projection.

In one embodiment, watermarks are provided in the first and second projections. In this embodiment, in response to detecting the overlapping area, the watermarks are located and identified. Watermark information in the watermarks identifies a media access control (MAC) address, a near field communication (NFC) identifier, and/or an internet protocol (IP) address of source systems of the first projection and the second projection. That is, assume that the first section 501 of the shared projection 500 in FIG. 5 was generated by a first device/computer, and that the second section 503 in FIG. 5 was generated by a second device/computer. Watermarks found in the first section 501 and the second section 503 respectively identify these first and second devices/computers. In one embodiment, the watermarks only identify a near field communication (NFC) identifier of these source systems (i.e., the first and second devices that generated the first and second sections of the shared projection). NFC follows a set of standards that allow two devices, such as smartphones, to establish radio communication with each other in response to being placed with close proximity (e.g., less than five centimeters) of one another. For example, assume that a first portable device is projecting the first section 501 shown in FIG. 5 and a second portable device is the second section 503. By receiving the NFC identifiers for each other, the two portable devices can then establish a new communication session to retrieve the other device's media access control (MAC) address and an internet protocol (IP) address. Similarly, if the shared projection 500 in FIG. 5 is being generated by a third device, using the content provided by these two portable devices, then the third device can interrogate the two portable devices using their NFC identifiers.

In one embodiment, the redundant resources are ranked, either manually by a user or automatically by a processor executing a ranking algorithm. For example, various widgets may be ranked higher or lower, depending on 1) their function; 2) how frequently they are used; 3) who owns them; 4) etc. Depending on such a ranking, the overlapping area (e.g., overlapping area 510 shown in FIG. 5) is populated only with redundant resources that are ranked below a predetermined level.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method of sharing an overlapping area on a shared projection, the method comprising:
    detecting, by a computing device, an overlapping area on a shared projection, wherein the shared projection presents content from a first projection and a second projection;
    identifying, by a computing device, redundant resources in the first projection and the second projection, wherein the redundant resources are a first resource in the first projection and a second resource in the second projection that perform a same function;
    displaying, by a computing device, a consolidated resource in the overlapping area, wherein the consolidated resource provides the same function as the first resource from the first projection and the second resource from the second projection;
    identifying, by a computing device, an inactive widget, wherein the inactive widget is a desktop widget in the first projection and the second projection that has not been activated for longer than a predefined period of time; and
    displaying the inactive widget in the overlapping area.

2. The method of claim 1, wherein the redundant resources are redundant desktop widgets, and wherein the method further comprises:
    identifying, by a computing device, the redundant desktop widgets as desktop widgets that are non-interactive widgets that provide only informational data.

3. The method of claim 1, wherein the redundant resources comprise widgets that present information that is independent of any user input.

4. The method of claim 1, further comprising:
removing, by a computing device, the first resource from the first projection and using, by a computing device, the second resource as the consolidated resource in the overlapping area.

5. The method of claim 1, wherein the first projection is generated by a first device and the second projection is generated by a second device, wherein the consolidated resource is a clock widget that provides a display of a current time, and wherein the method further comprises:
receiving a first activation of the clock widget by a user of the first device to display time from a first time zone; and
receiving a second activation of the clock widget by a user of the second device to display time from a second time zone.

6. The method of claim 1, further comprising:
creating, by a computing device, the consolidated resource from a combination of the first resource and the second resource; and
removing, by a computing device, the first resource from the first projection and the second resource from the second projection.

7. The method of claim 1, wherein the first projection is generated by a first device and the second projection is generated by a second device, and wherein the method further comprises:
determining, by a computing device, a level of system resources availability in the first device and the second device; and
in response to a computing device determining that the first device has fewer available system resources than the second device, removing, by a computing device, the first resource from the first projection and using, by a computing device, the second resource as the consolidated resource in the overlapping area.

8. The method of claim 1, further comprising:
in response to a computing device detecting the overlapping area, identifying, by a computing device, watermarks in the first projection and the second projection, wherein watermark information in the watermarks identifies at least one of a media access control (MAC) address, a near field communication (NFC) identifier, and an internet protocol (IP) address of source systems of the first projection and the second projection.

9. The method of claim 1, further comprising:
in response to a computing device detecting the overlapping area, identifying, by a computing device, watermarks in the first projection and the second projection, wherein watermark information in the watermarks identifies a near field communication (NFC) identifier of source systems of the first projection and the second projection;
establishing, by a computing device, a communication session with at least one the source systems; and
retrieving, by a computing device, a media access control (MAC) address and an internet protocol (IP) address of said at least one of the source systems.

10. The method of claim 1, further comprising:
receiving, by a computing device, a ranking of each of the redundant resources; and
populating, by a computing device, the overlapping area only with redundant resources that are user-ranked below a predetermined level.

11. The method of claim 1, wherein the shared projection is displayed on an electronic display.

12. The method of claim 1, wherein the shared projection is a projection onto a non-electronic medium.

13. The method of claim 12, wherein the first projection is generated by a first device and the second projection is generated by a second device.

14. A method of sharing an overlapping area on a shared projection, the method comprising:
detecting, by a computing device, an overlapping area on a shared projection, wherein the shared projection presents content from a first projection and a second projection, wherein the first projection is generated by a first device and the second projection is generated by a second device;
identifying, by a computing device, redundant resources in the first projection and the second projection, wherein the redundant resources are a first resource in the first projection and a second resource in the second projection that perform a same function;
displaying, by a computing device, a consolidated resource in the overlapping area, wherein the consolidated resource provides the same function as the first resource from the first projection and the second resource from the second projection;
determining, by a computing device, a level of system resources availability in the first device and the second device; and
in response to a computing device determining that the first device has fewer available system resources than the second device, removing, by a computing device, the first resource from the first projection and using, by a computing device, the second resource as the consolidated resource in the overlapping area.

15. A method of sharing an overlapping area on a shared projection, the method comprising:
detecting, by a computing device, an overlapping area on a shared projection, wherein the shared projection presents content from a first projection and a second projection;
identifying, by a computing device, redundant resources in the first projection and the second projection, wherein the redundant resources are a first resource in the first projection and a second resource in the second projection that perform a same function;
displaying, by a computing device, a consolidated resource in the overlapping area, wherein the consolidated resource provides the same function as the first resource from the first projection and the second resource from the second projection;
receiving, by a computing device, a ranking of each of the redundant resources; and
populating, by a computing device, the overlapping area only with redundant resources that are user-ranked below a predetermined level.

\* \* \* \* \*